United States Patent
Melin et al.

(10) Patent No.: US 9,102,533 B2
(45) Date of Patent: Aug. 11, 2015

(54) METHOD OF RECOVERING CHEMICALS

(75) Inventors: Kristian Melin, Aalto (FI); Kari Parviainen, Aalto (FI)

(73) Assignee: Aalto University Foundation, Aalto (FI)

( * ) Notice: Subject to any disclaimer, the term of this patent is extended or adjusted under 35 U.S.C. 154(b) by 0 days.

(21) Appl. No.: 14/001,956

(22) PCT Filed: Feb. 28, 2012

(86) PCT No.: PCT/FI2012/050199
§ 371 (c)(1),
(2), (4) Date: Oct. 31, 2013

(87) PCT Pub. No.: WO2012/117161
PCT Pub. Date: Sep. 7, 2012

(65) Prior Publication Data
US 2014/0054506 A1 Feb. 27, 2014

(30) Foreign Application Priority Data
Feb. 28, 2011 (FI) ...................................... 20115204

(51) Int. Cl.
*D21C 11/00* (2006.01)
*C01B 3/32* (2006.01)
(Continued)

(52) U.S. Cl.
CPC ... *C01B 3/32* (2013.01); *C01D 7/00* (2013.01); *C08H 6/00* (2013.01); *D21C 11/0057* (2013.01); *D21C 11/0007* (2013.01); *D21C 11/0078* (2013.01)

(58) Field of Classification Search
CPC .............. C02F 1/64; C02F 1/70; C02F 1/5236
USPC ........................................ 210/719, 21, 23, 24
See application file for complete search history.

(56) References Cited

U.S. PATENT DOCUMENTS 3,107,142 A * 10/1963 Schoeffel et al. ............. 423/183
3,755,068 A    8/1973 Rapson
(Continued)

FOREIGN PATENT DOCUMENTS

CA    1267507    4/1990
EP    0224721    6/1987
(Continued)

OTHER PUBLICATIONS

International Search Report for PCT/FI2012/050199 dated Aug. 3, 2012.
(Continued)

*Primary Examiner* — Stanley Silverman
*Assistant Examiner* — Syed Iqbal
(74) *Attorney, Agent, or Firm* — Andrus Intellectual Propertu Law, LLP

(57) ABSTRACT

A method of treating waste liquors which comprise organic compounds, in order to recover chemical compounds or to recycle chemicals. In the present method, the sodium-based waste liquor, which comprises organic compounds that are sourced from lignocellulose, is subjected to partial wet oxidation, in order to produce organic sodium salts, in which case the partial wet oxidation is carried out in conditions where at least part of the lignin is simultaneously precipitated. The precipitated filtrate or lignin is subjected to further processing. Most suitably, the organic sodium salts, such as Na acetate, which are generated in the partial oxidation of the waste liquor, are also subjected to further processing, in which case it is possible, from the lignin and the organic sodium salts, to efficiently produce compounds which as such are already of sufficient quality as chemicals, or which as gases are suitable for further processing, for instance for production of fuels.

29 Claims, 2 Drawing Sheets

Figure 1:
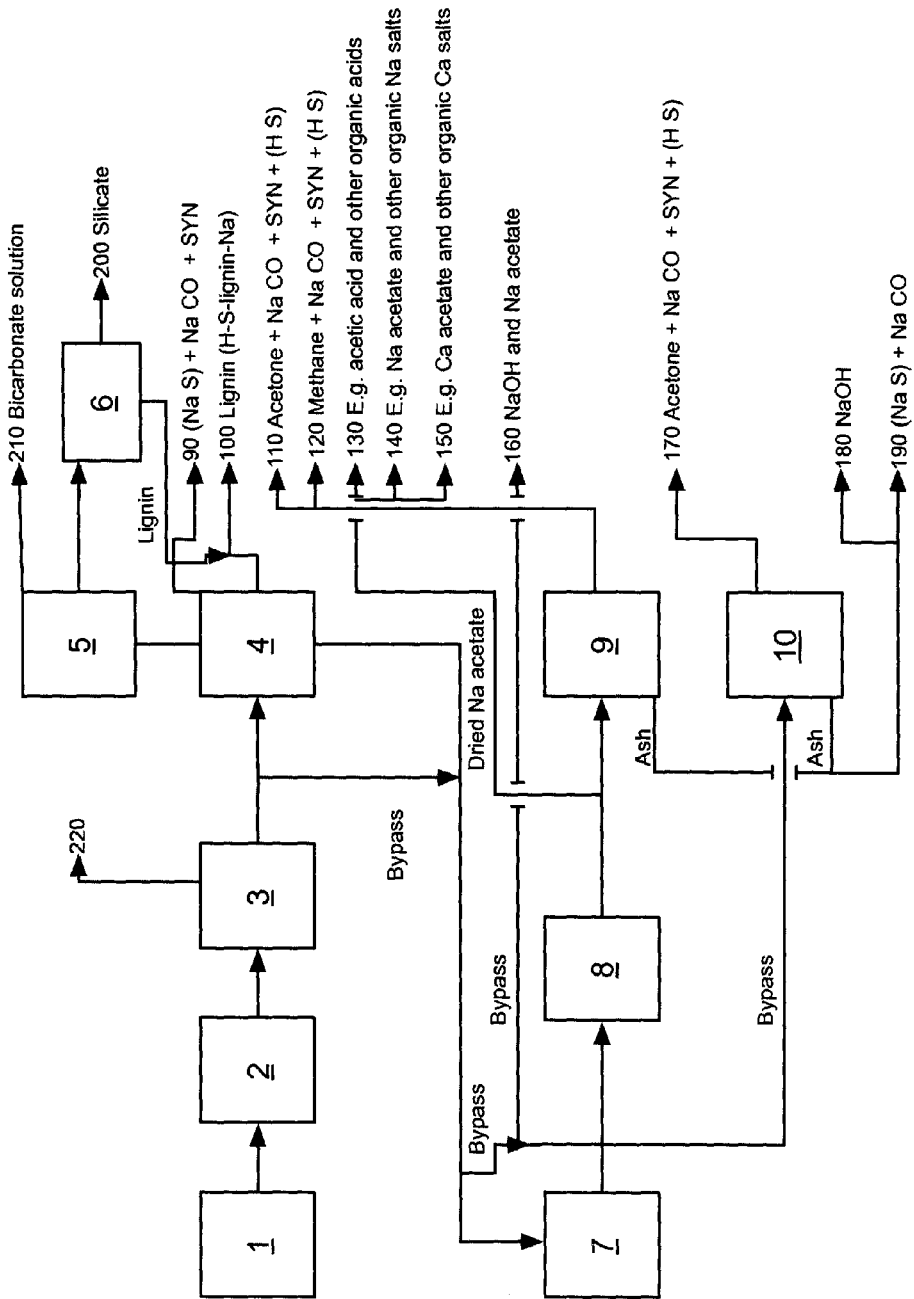

(51) Int. Cl.
  *C01D 7/00* (2006.01)
  *C08H 7/00* (2011.01)

(56) References Cited

U.S. PATENT DOCUMENTS

| | | | |
|---|---|---|---|
| 4,543,190 A | | 9/1985 | Modell |
| 5,082,571 A | | 1/1992 | Momont et al. |
| 5,595,628 A | * | 1/1997 | Gordon et al. ............ 162/30.11 |
| 8,591,737 B2 | * | 11/2013 | Kukkonen et al. ............ 210/260 |

FOREIGN PATENT DOCUMENTS

| | | |
|---|---|---|
| EP | 0251533 | 1/1988 |
| WO | 0079040 | 12/2000 |
| WO | 2008095252 | 8/2008 |

OTHER PUBLICATIONS

Written Opinion for PCT/FI2012/050199 dated Aug. 3, 2012.

* cited by examiner

METHOD OF RECOVERING CHEMICALS

CROSS REFERENCE TO RELATED APPLICATION

The present application is the U.S. national stage of International Application PCT/FI2012/050199, filed Feb. 28, 2012, which international application was published on Sep. 7, 2012, as International Publication No. WO2012/117161. The International Application claims priority to Finnish Patent Application No. 20115204, filed Feb. 28, 2011, the contents of which are incorporated herein by reference in their entireties.

The present invention relates to a method of recovering chemicals from alkaline waste liquors which comprise organic compounds, typically lignocellulose-based carbohydrates and lignin, and hydrolysis and reaction products of these, according to the preamble of claim 1.

According to such a method, the waste liquor is subjected to partial wet oxidation, at an elevated temperature and in the presence of oxygen, in order to at least partially oxidise the organic compounds. The oxidised compounds are recovered and, if desired, subjected to further processing.

The present invention relates to solutions regarding processing of waste liquors, such as black liquor, and waste liquors which are generated from alkaline treatment of wood chips, lignin and pulp, such as extraction and hydrolysis, especially for production of chemicals.

It is well studied how it is possible to refine renewable fibre reserves to different bio products, which can be used as fuels or initial materials for chemical industry products. The purpose has been for instance to create a biorefinery which would profitably produce biofuel, comparable with diesel oil.

Biorefineries, which are based on gasifying of cheap wood waste and utilisation of the Fischer-Tropsch synthesis, are expensive and the realisation of projects which are based on this concept demand substantial support from society. Gasification of pulp mill black liquor and converting the gas to biodiesel or other fuels by using the Fischer-Tropsch method is also well studied. A gasifier of this type (for instance ChemRec) is an expensive investment and the brick casings of the gasifier require annual service and repair operations. Brick abrasion is a result of the high operating temperature (typically 600-1000° C.).

Studies have been carried out with the objective, among others, to separate or process different organic chemicals from black liquor. For instance by prehydrolysis (autohydrolysis or chemical hydrolysis) of pulping, hemisugars have been extracted, which are then fermented to ethanol, acetic acid, isopropanol, butanol; it is possible to dissolve approximately 10% hemisugars from wood without any adverse effects on the quality of the pulp which is produced later in the process;

production of hemisugars by using a method that combines steam explosion and enzyme hydrolysis;
transformation of sugars into other compounds by using for instance catalytic hydrogenation;
concentration of sugars by using membrane technology;
use of lignin, which is precipitated from black liquor, for producing polymers (membranes); and
separation of carbonic acids (wood acids) from black liquor; to mention only some research subjects.

However, a problem with the prehydrolysis plants is that when the plants in question are integrated with pulp mills, they are too small and, relatively speaking, the investment is expensive. In principle, wood can be subject to total hydrolysis but the inhibitors (for instance materials that prevent fermentation) are harmful to further processing.

Modern technology makes it possible to separate hemisugars but the markets are limited, at least currently. It is possible to precipitate lignin from black liquor by lowering the pH value. Separation of other chemicals from black liquor is still at a laboratory stage.

In general, it can be established that the prehydrolysate of sulphate mill cooking and black liquor as such are not ideal raw materials of biocompounds.

There are already known processes in which waste waters that comprise organic compounds are subjected to partial wet oxidation. This type of wet oxidation of waste water is described for instance in U.S. Pat. No. 2,665,249 and U.S. Pat. No. 2,774,666. The patents in question describe how wet oxidation is carried out at different temperatures and pressures and at varying oxygen or air feed rates.

Oxidation of black liquor from a pulp mill is described in CA Patent No. 962,012, which is based on the invention "The Zimmerman Process in Soda Pulp Mill Recovery System", Appita Vol 22, No 3 (1968).

Currently, Siemens is selling a wet oxidation system under the name of "Zimpro Wet Air Oxidation". The system is designed for treatment of concentrated waste waters.

Besides the abovementioned publications, U.S. Pat. No. 4,756,837 describes how it is possible to maximise generation of organic Na salts by addition of $Na_2CO_3$ (alkali). Partial oxidation is carried out with air at a temperature of 200-210° C. and a pressure of 22-44 bar, in which case the concentration of sodium black liquor has been 21-24%. Thus, in the described invention, the wet oxidation is carried out at a high concentration of black liquor.

U.S. Pat. No. 5,595,628 describes a process in which wood or grasses are cooked with a NaOH solution ("soda cooking"), which cooking liquor comprises anthraquinone. The lean black liquor generated in the cooking is pumped to the recovery stage, which is based on partial wet oxidation.

Recovery of the black liquor generated in the cooking comprises the following stages:
(i) Wet oxidation of lean black liquor to organic Na salts, $CO_2$ and $Na_2CO_3$ and/or $NaHCO_3$;
(ii) Separation of anthraquinone from oxidised black liquor;
(iii) Heating of oxidised black liquor in such a way that $NaHCO_3$ disintegrates to $Na_2CO_3$;
(iv) Causticizing of $Na_2CO_3$ to NaOH;
(v) Separation of Na acetate from the causticized lye: a) Concentration of the solution to Na acetate crystals b) Concentration of the solution to Na acetate crystals. Treatment of the mother-liquor with membrane electrolysis or electrodialysis in order to separate the remaining Na acetate.

The known solution is complicated and it is not intended for the production of organic chemical compounds. U.S. Pat. No. 5,595,628 indicates that it is possible to separate lignin before the wet oxidation by adding acetic acid to the black liquor. However, this is expensive because of the high price of acetic acid.

Other examples of the above known technology are described in the following publications: EP 0 593 744; Industrial Crop and Products. 2005. Vol. 21, No. 3, pp 309-315; U.S. Pat. No. 4,728,393; U.S. Pat. No. 3,917,460; WO 03/031348; Wet air ox. Journal of Env. Engineering, 1989. Vol. 115, No. 2, pp 367-385; Conf. Proceedings of Tappi Pulping. 200. pp 49-56; Environmental Technology Letters, 1984. Vol. 5, No 1, pp 39-48 and U.S. Pat. No. 3,207,572.

In the publication Industrial Crop and Products. 2005. Vol. 21, No. 3, pp 309-315 there is a reference to production of acetic acid from sugar cane, by using peroxide in acidic conditions with the WPO (wet peroxide oxidation) method.

Furthermore, there is a reference to treatment of black liquor with oxygen and alkali for instance at a temperature of 145° C. and for a period of 45 min, in which case the viscosity decreased thereby facilitating vaporisation of the black liquor to high solids percentages (Louhelainen Jarmo, Alèn Raimo, Zielinski Julien, Tappi Journal, 2002, vol. 1, no. 10, pp. 9-13).

U.S. Pat. No. 7,332,095 describes a method which makes it possible to separate acetic acid and other organic compounds from a partially wet oxidised solution, which is acidic. Application of this method on black liquor and alkaline cooking liquor would probably demand addition of an acid, which is disadvantageous.

The purpose of the present invention is to eliminate the disadvantages associated with the known technology and to generate a new solution for treating waste liquors which comprise organic compounds, such that it is possible economically to produce and recover chemicals, especially commercial chemicals.

The present invention is based on the principle that sodium-based waste liquor which comprises organic compounds sourced from lignocellulose, is subjected to partial wet oxidation, in order to produce organic sodium salts, in which case the partial wet oxidation is carried out in conditions where, after the partial oxidation and cooling, at least part of the lignin is simultaneously precipitated. The precipitated lignin or the remaining solution is subjected to further processing. Most suitably, also the organic sodium salts, such as Na acetate, which are generated in the partial oxidation of the waste liquor, are subjected to further processing, in which case it is possible, from the lignin and the organic sodium salts, to efficiently produce compounds which already are as such of sufficient quality as chemicals, or which as gases are suitable for further processing, for instance for production of fuels.

More specifically, the new recovery method, the purpose of which is to produce different commercial chemical compounds and gases, according to the present invention, is characterised by what is stated in the characterizing part of claim 1.

Considerable advantages are achieved with the present invention. Thus, the present technology largely solves the problems described above, because the alkaline, Na-based black liquor is transformed by wet oxidation into a solution which comprises organic Na salts and which is easy to regenerate back to a cooking chemical, from which valuable biocompounds can be produced.

Examples of these are:
1) Biofuels
  methane, which can be burnt in a combined plant or refined to synthesis gas or delivered to a natural gas distribution pipe,
  acetone, from which is it possible to generate isobutene, which is a raw material of, among others, isooctane and ETBE (ethyl tert-butyl ether), which increase the octane number of petrol.
  Other examples are volatile organic compounds, such as acetone+CO+H$_2$+CH$_4$. Among the volatile compounds, for instance acetone can be washed off with water and the generated synthesis gas can be burnt in a gas boiler.
2) Biochemicals
  organic acids, such as formic acid, acetic acid and lactic acid and possibly also oxalic acid, malonic acid, succinic acid and fumaric acid, propionic acid, glycolic acid and their Na salts,
  methanol, ethanol and isopropanol, which are generated as by-products in the wet oxidation,
  Ca salts of the above-mentioned acids, when the solution is treated with CaCO$_3$, and
  Na salts, when acetic acid is treated with NaHCO$_3$ and crystallised.
3) Na Acetate, which Together with Acetic Acid can be Used as a Cooking Chemical in Pulp Production.

In addition, it is possible to partly oxidise part of the black liquor from a sulphate mill, to gasify the generated Na salts and to bring the dry generated ash to a soda recovery unit to be reduced. The method is a preferable way of increasing the capacity of a soda recovery unit.

A most significant advantage is that an existing soda recovery unit of a pulp mill (black liquor recovery boiler) can be replaced with a gasification unit for Na salts, which is much cheaper and safer. The recovery unit of the present invention is significantly more affordable (1 million AD t/y) than the recovery process in a large pulp mill (evaporation unit+soda recovery unit+causticizing+lime sludge reburning kiln+bark boiler).

The present invention is well suitable for instance for the following factory applications:
  1. Non-wood (bagasse, bamboo, grass) factories in which NaOH cooking is used. Currently, there are hundreds of factories in the world which do not have black liquor combustion and recovery and for which the present invention is suitable.
  2. Sulphate mill, which uses NaOH precooking, possibly with addition of anthraquinone. Appropriate for increasing the capacity of a normal sulphate mill.
  3. Modified new sulphur-free cookings, for instance NaOH+AQ cooking.
  4. For increasing the capacity of soda recovery units in conventional sulphate mills.
  5. Separation of chemicals from the black liquor of sulphate mills. In wet oxidation, the pH decreases, in which case it is possible to separate the salts of soluble organic acids, for instance sodium acetate, from the more poorly soluble lignin, bicarbonate and sulphate.

A well-known and old method of precipitating lignin from black liquor is to introduce carbon dioxide (combustion gas) into black liquor and to lower the pH value to 10.4. This method is appropriate for sulphide-free black liquors. The black liquor sulphide of a normal sulphate process becomes, in carbon dioxide treatment, hydrogen sulphide (H$_2$S), a partly hazardous and smelly substance, according to the reaction below:

$$Na_2S+CO_2+H_2O=Na_2CO_3+H_2S$$

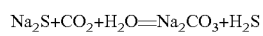

Also noteworthy is that in the described patents, wet oxidation is not processed at higher dry matter percentages than 24% dry matter. In a preferred embodiment of the present invention, a higher dry matter percentage is used in order to achieve optimal process conditions.

The higher dry matter percentage of black liquor generates the following advantages:
  The residual alkalinity of lean black liquor (NaOH or NaOH+0.5*Na$_2$S) increases when the black liquor is concentrated (possibly, there is no need to add alkali)
  The physical dimensions of the wet oxidation equipment is significantly smaller
  The temperature of the concentrated black liquor increases easily to the right reaction temperature and pre-heating of air and feed is not needed. The reaction heat can be used to develop steam.
  The reaction rate of partial oxidation increases.

In the following, the present invention will be examined more closely with the aid of a detailed description and the accompanying drawings.

Figure 2:
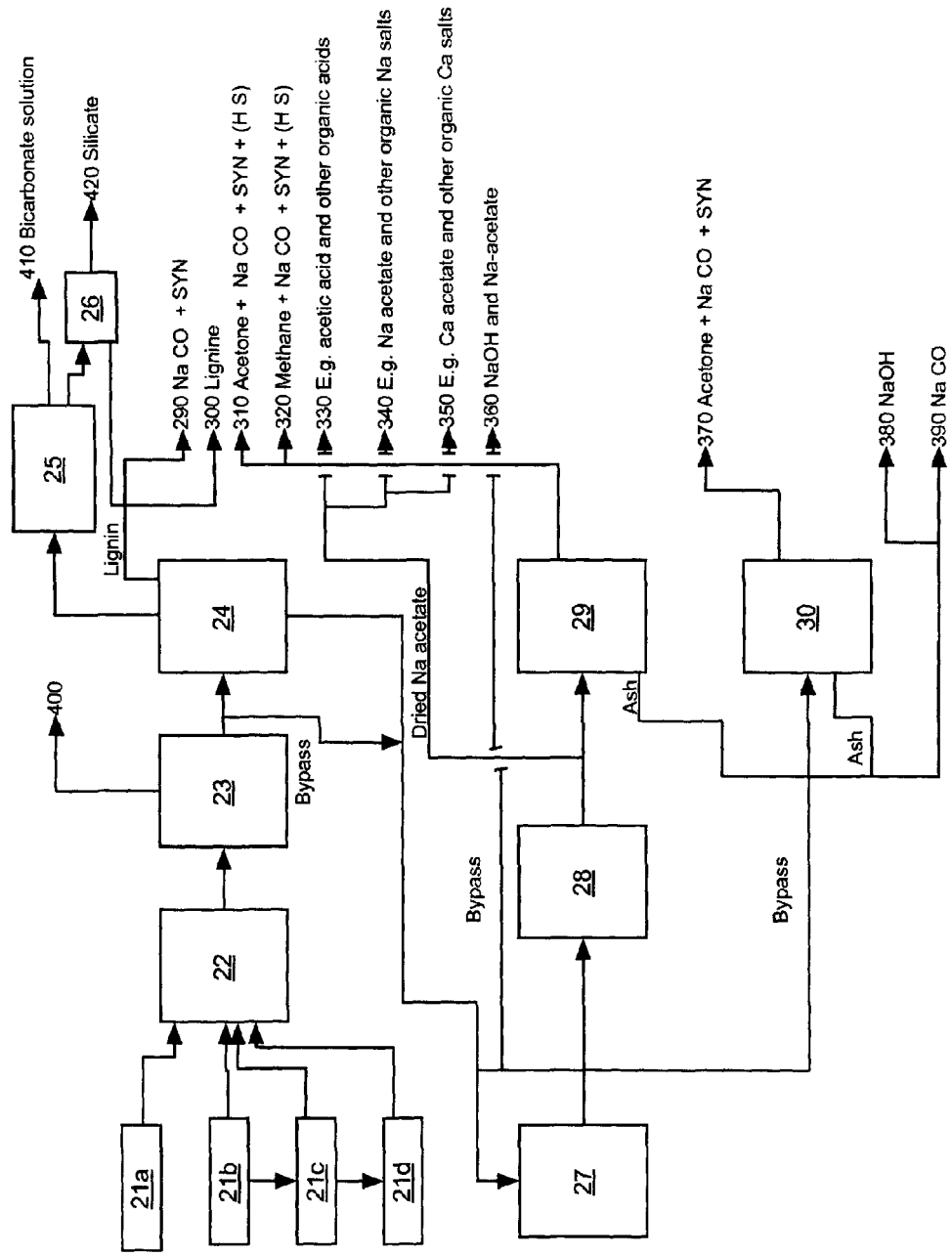

FIG. 1 shows a simplified process flowchart of how black liquor is partly wet oxidised in order to generate chemical compounds and to replace the soda recovery unit, and FIG. 2 shows a corresponding simplified process flowchart of a biorefinery, where the initial material used is for instance an alkaline solution which is generated from wood chips by alkali treatment (dissolution)—alternatively, the initial material is generated by a corresponding alkali treatment from hydrolysis of wood chips, dissolution of lignin or hydrolysis of pulp.

DETAILED DESCRIPTION OF THE EMBODIMENTS OF THE PRESENT INVENTION

The following reference numbers for the operations of the process are used in FIGS. 1 and 2:
1 Pulp cooking
21a Dissolution of wood chips with alkali
21b Hydrolysis and alkali treatment of wood chips
21c Dissolution of lignin with sodium hydroxide and anthraquinone
21d Hydrolysis and alkali treatment of pulp
2, 22 Vaporisation/by-pass of black liquor
3, 23 Partial oxidation of black liquor
4, 24 Optional precipitation of lignin, bicarbonate and silicate
5, 25 Dissolution of bicarbonate
6, 26 Separation of lignin/silicate
7, 27 Vaporisation, crystallisation of black liquor, or a combination thereof
8, 28 Drying of black liquor residue
9, 29 Pyrolysis of dried Na salts
10, 30 Pyrolysis of black liquor and Na salts In addition, the product flows or their further processing are numbered as follows:
90, 290 Soda recovery unit or reduction oven
100, 300 Centrifugation and drying
110, 310 Disintegration of sodium acetate to methane, acetone and sodium carbonate
120, 320 Disintegration of sodium acetate with sodium hydroxide
130, 330 Acidification and distillation
140, 340 Reaction of acetic acid and sodium bicarbonate to form sodium acetate
150, 350 Treatment of acetic acid and other organic acids with calcium carbonate
160, 360 Causticizing and recycling of oxidised black liquor to pulp cooking
170, 370 Pyrolysis
180, 380 Separation and causticizing of carbon
190, 390 Recovery of ash and feeding of it to the soda recovery unit
210, 410 Bicarbonate solution
200, 420 Silicate residue
220, 400 Residue gas ($CO_2$, CO, organic volatile compounds) of wet oxidation.

As mentioned above, it is possible to apply the present invention in general to recovery of chemicals from alkaline waste liquors, which comprise organic compounds, typically lignocelluloses-based carbohydrates and lignin, and hydrolysis and reaction products of these.

Examples of alkaline solutions to be treated are waste liquors, which comprise sodium ions, from pulp mills, such as black liquor, and also waste liquors, which are generated in alkaline treatment of wood chips, lignin and pulp, such as extraction and hydrolysis. By using partial wet oxidation, these liquors can be treated in such a way that the waste liquor generated in the oxidation can after that be used to produce valuable organic compounds. It is also possible to produce synthesis gas. More preferably, after the partial wet oxidation, it is possible to produce from the waste liquor, by drying and gasifying, volatile organic compounds, such as acetone, ketones, alcohols, methane, acetic acid, formic acid, ethene, methanol and aldehydes, and combinations of these, or methane or synthesis gas.

According to an alternative solution, the sodium-based waste liquor, which comprises organic compounds that are sourced from lignocellulose, is treated, to recover chemical compounds, by subjecting it to partial wet oxidation in order to generate organic sodium salts in conditions, in which case the partial wet oxidation is carried out in conditions where the lignin or at least part of it is simultaneously precipitated.

In another alternative solution, which can be combined with the preceding solution, the partial wet oxidation is carried out in such a way that the lignin (or part of it) is precipitated after additional vaporisation.

In a third alternative solution, which, too, can be combined with the second or with both preceding solutions, the partial wet oxidation is carried out in such a way that inorganic salts can be simultaneously precipitated or, alternatively, the salts can be precipitated after a possible additional vaporisation.

According to a fourth alternative solution, which, if desired, can be combined with other solutions that are described above, organic compounds, their alkali salts or synthesis gas or mixtures thereof are produced from wet oxidised waste liquor—after separation of precipitating components.

In a fifth alternative solution, which, if desired, can be combined with other solutions that are described above, precipitated lignin or a solution which can comprise lignin, or both the lignin and the solution are subjected to further processing.

As an example, it is possible to carry out the present method in such a way that, after the partial wet oxidation and possible additional vaporisation, at least part of the lignin and/or inorganic salts, for instance bicarbonate, carbonate or sulphate salts, are precipitated, and volatile organic compounds or synthesis gas and/or their alkali salts, are produced from the wet oxidised waste liquor. The precipitated lignin and/or the solution are subjected to further processing.

On the basis of the above, one preferable embodiment of the present invention is associated with a case in which lignocelluloses-based raw material, such as wood or grasses, is cooked with an alkaline cooking liquor, especially with a Na-alkaline cooking liquor. Examples of cooking methods are soda cooking, sulphate cooking, oxygen cooking in alkaline conditions, and different combined cookings, in which one of the components used is sodium hydroxide or sodium carbonate or mixtures or combinations thereof. The generated black liquor is concentrated by vaporisation to a dry matter percentage which is optimal for the process, after which the black liquor is pumped to the recovery stage, which is based on partial wet oxidation.

The black liquor which is generated in the prevaporisation is recovered. The prevaporised black liquor is wet oxidised ideally to be totally soluble, which simplifies the transformation of the carboxylic acids to Na salts or soluble Na salts of carboxylic acids and solid lignin. Finally, the black liquor which comprises organic Na salts is vaporised.

The black liquor which comprises Na salts is dried and the ashy Na salts are stored.

Associated with the present invention, we have found that wet oxidation lowers the pH value of the black liquor and that the lignin which is comprised in the black liquor starts to precipitate at a pH value of 8-10.4, depending on the concentration of the oxidised solution, the reaction conditions of the partial wet oxidation and the composition of the black liquor (sulphur-free or sulphate black liquor). Consequently, it is possible to economically recover the precipitating/precipitated lignin. Thus, preferably the lignin is separated from the oxidised black liquor and then dried.

Another preferred embodiment of the present invention is associated with a solution which is generated from an alkali dissolution and/or hydrolysation of fine wood chips from a biorefinery. In the processing of the wood chips, dissolution methods for dissolving polysaccharides, which methods are already known in pulp technology, are applied.

When fine wood chips are treated with a $NaOH+Na_2CO_3$ solution, the hemicellulose is efficiently degraded, especially due to the effect of sodium carbonate ($Na_2CO_3$). It is possible to use for instance this dissolving method in the present technology. An advantage of this method is that $Na_2CO_3$ is a cheaper dissolving chemical than sodium hydroxide (NaOH).

It is also possible to apply the present invention in cases where fine wood chips are hydrolysed with a sulphuric acid solution. The hydrolysate generated in the hydrolysis is alkalised for instance with NaOH or $Na_2CO_3$, after which the alkaline solution can be treated in a partial wet oxidation.

In preliminary tests at the Aalto University it was found that neutralisation of a hydrolysate with NaOH results in an alkali consumption of 130 g NaOH/kg (dry matter), when the amount of dry matter dissolved from the wood is 28%.

A third preferred embodiment of the present invention is associated with the waste liquor which is generated in the dissolving of the lignin of the residual pulp from the alkali dissolution or/and hydrolysis of the wood chips from a biorefinery.

In this technology, alkaline dissolving methods of lignin, which are known from pulp technology, are applied, one may use for instance the NaOH+AQ (anthraquinone) method, known to be used in dissolving. An advantage of this wet oxidation of waste liquor is that anthraquinone is precipitated in the oxidation and can be recovered and returned to the dissolving of the lignin.

The residual pulp which is generated in the dissolving of the lignin can be hydrolysed with a known method, either with autohydrolysis (oxygen is not used) or by adding a small amount of a mineral acid, at a temperature of 210-260° C. The hydrolysate generated in the hydrolysis is alkalised for instance with NaOH or $Na_2CO_3$, after which the alkaline solution can be treated in a partial wet oxidation.

The preferred embodiments of the present invention are based on partial wet oxidation of alkaline waste liquor having an optimal concentration, which generates, from the waste liquor of pulp and hemisugars (monosaccharides and polysaccharides) and lignin and extractives, mainly Na salts of simple carboxylic acids. Examples of these are Na acetate, Na formate, Na lactate, Na malonate, Na oxalate, Na succinate and Na fumarate.

Na salts are suitable initial materials for producing organic chemicals. Such chemicals are produced for instance from the above-mentioned Na salts by using known chemical reactions and unit operations of the chemical industry, as described more closely below in association with the process diagrams.

A generated disintegration product of the Na salts is inorganic sodium bicarbonate ($NaHCO_3$) which is easy to regenerate to sodium hydroxide (NaOH) in a causticizing plant.

The pH value of the waste liquor decreases in wet oxidation and the lignin is precipitated at a pH value of 8-10.4, after which it is easy to process.

The theoretical background of partial oxidation is described in the publication Journal of Environmental Engineering (J-N Foussard, H Debellefontaine and J Besombes-Valihe, American Society of Civil Engineering Vol. 155, 2 Apr. 1989).

Based on the information in the publication, the wet oxidation of the waste liquor in the present invention is carried out in conditions and with yields which generate mainly Na acetate, Na formate and Na lactate, but also other organic Na salts.

The yield of Na acetate is strongly dependent on the temperature and the processing time. The partial pressure of air is not very important.

In the present solution, too high a temperature, typically over 320° C. or at maximum over 350° C., is not advantageous, but at that temperature the Na acetate starts to disintegrate to carbon dioxide and water. Lower temperatures (160-250° C.), such as 200-250° C. of the wet oxidation, in turn, only partly change the lignin to Na acetate, and the rest of the large-molecular lignin particles begin to precipitate, when the pH value is decreased to approximately 8-10.4.

If oxygen gas is mixed in the air, the reaction rate increases substantially. Also, a higher dry matter percentage of the black liquor increases the reaction rate.

It is possible to increase the yield of Na acetate by adding an alkali, such as carbonate ($Na_2CO_3$). In this case, the yield increase is explained by the following equilibrium reactions:

The oxidation reaction generates carboxylic acids and Na salts of acids:

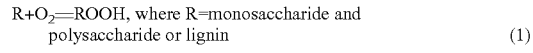

$R+O_2=ROOH$, where R=monosaccharide and polysaccharide or lignin     (1)

$ROOH+Na_2CO_3=ROONa+NaHCO_3$     (2)

The result is mainly Na acetate, Na formate, Na lactate and Na glycolate. If the wet oxidation is continued, the final product comprises mainly Na acetate and $NaHCO_3$.

The Reactions of Lignin:

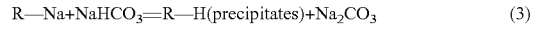

$R\text{—}Na+NaHCO_3=R\text{—}H(\text{precipitates})+Na_2CO_3$     (3)

Reaction (3) generates $Na_2CO_3$ and the neutralisation reaction (2) consumes it. It should be ensured that there is enough alkali to neutralise the organic acids to Na salts. Alkali is also needed to make the oxygen reactive.

When sulphate black liquor is wet oxidised, the same reactions as above, (2) and (3), take place. The residual hydrogen sulphide in the black liquor reacts as follows:

$2NaHS+2O_2=Na_2S_2O_3+H_2O$     (4.1)

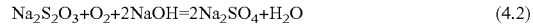

$Na_2S_2O_3+O_2+2NaOH=2Na_2SO_4+H_2O$     (4.2)

Thus, sodium thiosulphate and sodium sulphate are generated.

The smelling organic compounds in the black liquor react with oxygen and thus form odourless sulphur compounds. Sulphate black liquor comprises "malodorous gas sulphur" 1-2 kg TRS/ADt (TRS=Total Reduced Sulfur).

It is known that the most part of the sulphur in the dry matter, i.e. 5-6% of the quantity of the dry matter, is bound to the lignin, and the sulphur follows the lignin sediment to further processing.

Based on the above, the present invention operates in conditions which are optimal for the partial wet oxidation, generally the temperature is approximately 160-350° C., more preferably, the temperature is approximately 180-350° C. In a preferred embodiment, the temperature is 200-350° C.

Furthermore, in partial wet oxidation, the dry matter amount can be 5-95% by weight, the operation pressure 1-50 bar(a), particularly approximately 5-50 bar(a), most suitably approximately 7.5-50 bar(a), the partial pressure of oxygen is approximately 1-40 bar(a), particularly approximately 2-30 bar(a) and the treatment time approximately 10 s-100 h, particularly approximately 1 min-10 h, most suitably approximately 10 min-5 h.

The reaction can be carried out in a batch reactor, semi-batch reactor or flow-through reactor. The reaction zone can comprise one or several reactors (a combination of the above-mentioned reactors, similar reactors or different reactors; the reactors can be arranged in series or side by side.

In one embodiment, acids of sodium salts are produced from wet oxidised and dried black liquor. From the sodium salts it is possible to produce acids, for instance
- by adding mineral acid into the dried black liquor, in order to form a mixture, after which the mixture is distilled, or
- by subjecting, in order to form a complex, the sodium salts into a reactive extraction ("acid springing") where an extraction solvent, such as tertiary amine, is utilised, after which the generated complex is disintegrated to form acids of sodium salt.

Below, the accompanying drawings will be examined in more detail.

In the solution shown in FIG. 1, the black liquor, which is generated from a Na-based pulp cooking, is "lean", which means that its dry matter percentage is approximately 5-20% by weight, the black liquor is concentrated by prevaporisation 2 to a dry matter percentage of over 20% by weight, after which the concentrated black liquor is subjected to partial wet oxidation, which is indicated by reference number 3. If the dry matter percentage of the black liquor entering the process is already over 20% by weight, for instance over 20% by weight—approximately 35% by weight, it is possible to bypass the prevaporisation 2 and bring the black liquor directly to the partial wet oxidation 3.

The partial oxidation 3 is generally carried out at an elevated temperature, which is typically approximately 160-320° C.

If the operating temperature is lower (approximately 160-250° C.), it is possible to generate, in the alkali waste, Na salts of short-chained carboxylic acids (typically of $C_1$-$C_6$-carboxylic acids). When the waste liquor, which is subjected to the wet oxidation, is wet oxidised in such a way that the pH value of the waste liquor decreases to a value of approximately 8-10.4, at least part of the lignin begins to precipitate. In this case, the wet oxidation generates a treated black liquor composition, which comprises, besides sodium salts of short-chained carboxylic acids, also precipitated lignin.

At a higher temperature (over 250° C., typically at maximum 310° C.), a substantial part, even the most part of the lignin is oxidised and degraded, in which case organic Na salts are generated from it, too.

Air, oxygen gas or a mixture of these (for instance air enriched with oxygen) is used in the oxidation. Typically, the percentage of oxygen in the gas in the oxidation is 20-100% by volume.

When the black liquor or a corresponding alkaline waste liquor is wet oxidised at a lower temperature, as explained above, it is led to the precipitation 4, after which the black liquor generated from the precipitation of the lignin is led to the evaporative crystallisation 7. If the wet oxidation is carried out at a higher temperature, as described above, the oxidised black liquor is led directly to the evaporative crystallisation 7 of black liquor. If needed, the evaporatively crystallised black liquor is wet oxidised anew. This action, too, can be carried out in unit 7.

The precipitate generated from the precipitation is led to dissolving 5 of bicarbonate, where the bicarbonate is dissolved while the lignin and possible silicate remains in the sediment.

The bicarbonate can be either causticized or returned to the cooking 1. The lignin can be separated from the silicate by dissolving the lignin in a solvent, in which the silicate does not dissolve in the lignin separation 6.

The cooking chemicals (mainly sodium compounds) can be recycled in the method, without concentrating the solution to a concentration over 40% by weight. It is known that in a more concentrated solution, the silicate is precipitated causing accumulations for instance on the surfaces of heat exchangers.

In the causticizing, it is possible to regenerate sodium bicarbonate or sodium carbonate to sodium hydroxide. For silicate removal it is possible to use, besides partial wet oxidation, also a known method, such as precipitation with for instance CaO or carbon dioxide. Consequently, this method can be used also for recycling cooking chemicals in a noon-wood pulp mill, either separately or in combination with a known method of removing silicate. The crystallised Na salt, which is generated from the evaporative crystallisation 7, and possible lignin are led either to drying 8 or directly to pyrolysis of black liquor 10. The drying is carried out at a low temperature, for instance approximately 120-150° C., in order to avoid decomposition of Na salts. The dried Na salt composition is led to gasification of dry ash 9, where it is possible to generate different chemical compounds (product flows 110-160), by changing conditions.

The solution shown in FIG. 2 differs from the process in FIG. 1 with regard to the raw material of the process in such a way that the alkaline waste liquor, which acts as raw material, is generated in a biorefinery, i.e. in general in a plant where lignocellulose-based raw material is processed—or an intermediate product generated from such a material—in order to produce energy, fuels or chemicals or combinations thereof.

Thus, the following is fed into the process which is described in more detail below
- alkaline waste liquor which is generated in the alkaline primary dissolution (reference number 21a) of Na-based wood chips, or
- waste liquor 21b which is generated in the alkalisation of the hydrolysate coming from the hydrolysis of the wood chips, or
- alkaline waste liquor 21c which is generated in the dissolving of the lignin-bearing pulp, or
- waste liquor 21d generated in the hydrolysis of the pulp residue and in the alkalisation of the hydrolysis, or
- a mixture of two or more of the above-mentioned waste liquors.

Naturally, it is possible to combine one or more of the above-mentioned waste liquors with the black liquor.

Similarly to the case in FIG. 1, the alkaline waste liquor (21a-21d), the dry matter percentage of which is below 20% by weight, typically approximately 5-below 20% by weight, is concentrated in the prevaporisation 22 of the black liquor to a dry matter percentage of at least 20% by weight, preferably to a dry matter percentage over 20% by weight, after which the concentrated black liquor is subjected to partial wet oxidation, which has the reference number 23. If the dry matter percentage of the black liquor which is subjected to the process is already at least 20% by weight, for instance 20% by weight-35% by weight, the prevaporisation 22 can be bypassed and the concentrated black liquor subjected directly to partial wet oxidation 23.

In the case shown in FIG. 2, after this, it is possible to continue in a quite similar way as in the process in FIG. 1. Thus, it is possible to carry out partial oxidation of the waste alkali which is subjected to a suitable dry matter percentage, either at a lower temperature (160-250° C.), in which case Na salts of short-chained carboxylic acids and precipitated lignin are generated at a pH value below 8-10.4, or at a higher temperature (250-310° C.), in which case also the most part of the lignin is oxidised and degraded to the above-mentioned organic Na salts. Air, oxygen gas or a gas mixture of these (for instance air enriched with oxygen) is used in the oxidation, as described above. Typically, the percentage of oxygen in the gas in the oxidation is 20-100% by volume.

If the waste liquor is wet oxidised at a lower temperature, it is led to the precipitation stage 24 or, if it is wet oxidised at a high temperature, the oxidised waste liquor is led directly to the evaporative crystallisation 27 of the black liquor. The waste liquor from the precipitation of lignin 24 is also led to the evaporative crystallisation 27. If needed, the evaporatively crystallised alkaline waste liquor is wet oxidised anew 23.

The crystallised Na salt (and possible lignin) which is generated in the evaporative crystallisation is led either to the drying 28 or directly to the pyrolysis 30 of the waste liquor. The drying is carried out at a low temperature (120-150° C.), to avoid breaking up of the Na salt. The dried Na salt is led to the pyrolysis 29 of dry ash, where different chemical compounds can be generated by changing conditions.

It is possible to process the material flows generated in the processes shown in FIGS. 1 and 2, which are described above, to commercial compounds by using methods which are known per se. In the following, these are examined in more detail:

a) Reference Number 90—Lignin is LED into a Soda Recovery Unit or a Reduction Oven Precipitated lignin is centrifuged and dried and then led to a smelt bed of a soda recovery unit or to a separate reduction oven (sulphate cooking), where the following reactions take place:

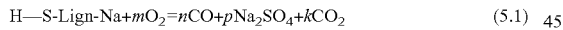

$$H\text{—}S\text{-Lign-Na}+mO_2=nCO+pNa_2SO_4+kCO_2 \quad (5.1)$$

$$Na_2SO_4+4CO=Na_2S+4CO_2 \quad (5.2)$$

in which formulas m, n, p and k are integers 1-20 and they describe the quantities of chemical elements of lignin (quantities vary according to the kind of wood).

Reference Number 290—Lignin is LED into a Soda Recovery Unit

The precipitated lignin is centrifuged and dried and then led to burning, where the following reaction takes place:

$$H\text{-Lign-Na}+mO_2=nNa_2CO_3+pH_2O+kCO_2 \quad (5.1')$$

in which formula m, n, p and k are integers 1-20 and they describe the quantities of chemical elements of lignin (quantities vary according to the kind of wood).

b) Reference Number 100, 300—Drying and Selling of Lignin

Centrifuging and drying and selling of precipitated lignin c) Reference Number 110, 310—Production of Acetone and Synthesis Gas (SYN)

The organic sodium salts which are generated in the drying 9, 29, which possibly are recovered together with the lignin, are gasified, in which case a disintegration reaction of Na acetate and Na formate takes place:

$$2*CH_3COONa=(CH_3)_2CO+Na_2CO_3 \quad (6a)$$

$$2HCOONa=Na_2CO_3+CO+H_2 \quad (6b)$$

The other organic Na salts are disintegrated and form volatile organic compounds and sodium carbonate. The generated acetone and possible other volatile organic compounds, mainly ketones, alcohols and aldehydes, are absorbed into water and sold as raw material for the chemical industry. Alternatively, it is possible, for instance by using known chemical deoxidation reactions assisted by catalysts, to further process them to good bio fuel components, among others isobutene or isopropanol or a mixture thereof.

The remaining synthesis gas is used to generate energy. The ash remaining after gasification, which comprises $Na_2CO_3$ and carbon, goes via carbon filtering to be causticized.

d) Reference Number 120, 320—Production of Methane and Synthesis Gas

The Na acetate which is generated in the drying 9, 29, and which possibly comprises lignin, is gasified together with NaOH or/and CaO, in which case a disintegration reaction takes place:

$$CH_3COO\text{—}Na+NaOH(CaO)=CH_4+Na_2CO_3 \quad (7)$$

The generated methane (and synthesis gas) goes to further processing or energy generation.

e) Reference Number 13, 33—Production of Organic Acids

Acetic acid and other acids are produced from the Na salts, which are generated in the drying 9, 29, by acidifying with a mineral acid. The salts of the acids are disintegrated thereby forming acids of each salt and sodium sulphate ($Na_2SO_4$). It is possible to separate the volatile acids from each other by distillation, and the other acids on the basis of their solubility. The sodium sulphate solution can be concentrated and then sold.

f) Reference Number 140, 340—Production of Na Salts

The aqueous solution which was generated in the previous process e), is mixed with dried ash that comprises Na salts, which ash also comprises sodium bicarbonate ($NaHCO_3$), in order to generate the following reaction, for instance to produce Na acetate:

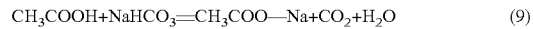

$$CH_3COOH+NaHCO_3=CH_3COO\text{—}Na+CO_2+H_2O \quad (9)$$

The Na acetate generated in the reaction (9) and the original Na acetate from the ash are crystallised, dried and then sold. The same reaction mechanism applies also for other organic Na salts.

g) Reference Number 150, 350—Production of Ca Salts

The acetic acid generated in process e) is treated with a $CaCO_3$ solution, in which case for instance the following reaction takes place, which makes it possible to produce Ca acetate:

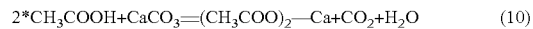

$$2*CH_3COOH+CaCO_3=(CH_3COO)_2\text{—}Ca+CO_2+H_2O \quad (10)$$

The generated Ca acetate is crystallised and dried to be sold. This procedure applies to the other organic Na salts, too.

h) Reference Number 160, 360—Returning of Na Acetate to the Pulp Cooking Returning of the Na acetate to the pulp cooking accelerates the effect of the anthraquinone on the dissolution of the lignin and reduces the alkali dosage in the cooking. The ash, generated in the drying 9, 29, which comprises Na acetate and $NaHCO_3$ is causticized, in which case the following reaction takes place:

$$2*NaHCO_3+Ca(OH)_2=2*NaOH+CaCO_3+H_2O \quad (11)$$

The calcium carbobate is precipitated and the sodium hydroxide (the active substance in pulp cooking) together with the Na acetate is returned to the pulp cooking.

i) Reference Number 170, 370—Production of Synthesis Gas (SYN)

The synthesis gas ($CO$, $CH_4$, $H_2$, $CO_2$), which is generated in the gasifying 10, 30 of the black liquor, is subjected to energy generation or to further processing (for instance Fischer-Tropsch). By lowering the gasifying temperature, acetone and volatile organic cpmpounds are generated, such as acetone, methane and synthesis gas. The polar compounds, such as acetone, can be absorbed in water and the synthesis gas can be used for energy generation.

j) Reference Number 180, 380—Causticizing of the Gasifying Ash to NaOH

The solid carbon and other solid compounds are removed by filtering from the ashes which are generated in the gasifying 9, 29 of the dry ash and, correspondingly, from the gasifying 10, 30 of the black liquor, and the remaining $Na_2CO_3$ is causticized to NaOH. The residual carbon is burnt.

temperature of slightly over 100° C., by discharging some steam from the exit of the reactor. The reactor vessel was heated with a heat jacket to slightly below the reaction temperature and after the oxygen feed was started, the temperature of the reaction vessel increased to the target temperature in a few minutes.

The pressure of the reaction vessel was kept at 60 bar, of which the partial pressure of oxygen was approximately 6 bar. When the pressure of the reactor decreased, the pressure regulator fed more gas from the gas container, and the exit of the reactor was kept closed during the test. The reaction temperature was 270° C. during the test. The partial pressure of oxygen was 6 bar. The temperature and the pressure were kept constant. The dwell time was 80 min and the oxidant used was pure oxygen. The initial material and the product were analysed at The VTT Technical Research Center of Finland by using the capillary electrophoresis method.

Table 1 shows the analysis of the initial material and the oxidised product.

| Acids | oxalate | formate | succinate | acetate | glycolate | lactate | COD chem. O2 cons. | TOC Org. carbon | Unit |
|---|---|---|---|---|---|---|---|---|---|
| Feed (black liquor of wheat straw) | 1.3 | 3.0 | 0.2 | 7.5 | 1.5 | 1.4 | 227 | 91 | g/L |
| Oxidised sample | 1.4 | 9.4 | 1.7 | 31.1 | 8.6 | 10.6 | 125 | 58 | g/L | k) Reference Number 190, 390—Gasifying Ash is LED to the Soda Recovery Unit

The ash from the gasifyings 9, 29 and 10, 30 is led with a separate screw to a smelt bed of a soda recovery unit or sprayed together with the concentrated liquor into the furnace of the soda recovery unit.

l) Reference Number 220, 400—the Residual Gas from the Wet Oxidation, which Gas Comprises the Residual Gases Oxygen, Nitrogen, Water Vapour, Carbon Dioxide, Carbon Monoxide and Possibly Volatile Organic Compounds, Such as Methanol, can be Driven into the Boiler Alternatively, it is possible to recover possible organic compounds by cooling the exhaust gas before it is directed into the boiler.

m) Reference Number 210, 410—it is Possible to Causticize a Bicarbonate Solution and Send it Back to the Cooking Process, or to Sell it as a Product.

k) Reference Number 200, 420—it is Possible to Recover Silicate and Sell it as a Product.

Example 1

Aalto University has tested partial wet oxidation of soda black liquor, by using oxygen. The soda black liquor is sourced from cooking wheat straw with a laboratory boiler, using the following parameters: fibre yield 55%, cooking temperature 160° C., liquid/wood ratio 5 and NaOH dosage 16% per dry wheat straw.

First, the black liquor of wheat straw is vaporised to a concentration of approximately 21% by weight. The following test has been carried out with wheat straw. Approximately 75.6 g of vaporised black liquor was added into a reaction vessel (100 ml) which was equipped with a mixer. The mixing was started and the air was removed from the reactor at a In a second test, 71.3 g of black liquor was fed into the reactor under the same conditions (temperature 270° C. and partial pressure of oxygen 6 bar, and with the same raw materials. The quantity of the remaining reaction product (liquid+precipitated solids) after the reaction was 53.51 g, when the pressure was discharged from the reactor and it had cooled to room temperature. The percentage of the lignin, which was insoluble in the acid of the solution, was estimated to be approximately 8 g/L, i.e. significantly smaller than the lignin percentage of the original black liquor. The dry matter percentage of the black liquor was approximately 20% by weight before the reaction and approximately 17% by weight after the reaction.

The initial material and the product were vaporised to be dry in a heating chamber and the sediment was heated by using a thermogravimetric analysis 10° C./minute starting at room temperature and ending at 600° C. The gases were analysed by using a FTIR analysis. According to the analysis, the gas comprised a significant amount of methane, carbon dioxide and water. Furthermore, at least carbon monoxide and methanol were generated. Also, small amounts of acetic acid and formic acid were observed in the analysis. Methane was generated mainly at a temperature of 300-500° C.

Example 2

In the same way as in example 1, black liquor from a sulphate mill was treated with partial wet oxidation under the following conditions: temperature 275° C., partial pressure of oxygen 6 bar and reaction time 100 min. The analysis of the initial material and the product are shown in table 2.

Table 2 shows the results for the sulphate black liquor.

| Acids | oxalate | formate | succinate | acetate | glycolate | lactate | COD (chem. O2 cons.) | TOC org. carbon | Unit |
|---|---|---|---|---|---|---|---|---|---|
| Feed (Kraft black liquor) | 2.2 | 7.3 | 0.4 | 6.6 | 3.6 | 3.6 | 180.2 | 79.54 | g/L |
| Oxidised sample | 4.4 | 7.4 | 1.1 | 13 | 5.3 | 4.7 | 129.1 | 52.35 | g/L |

When the test was reproduced, using the same feed and at similar reaction conditions, 270° C., partial pressure of oxygen 7 bar, reaction time 80 minutes, 68 g of liquid and solid product were generated, whereas initially 70.6 grams of black liquor was fed into the reactor.

According to the laboratory assay, the remaining lignin which is insoluble in acid, was approximately 8.4 g/l.

Example 3

In a laboratory test, the Aalto University has found that the alkali consumption of a wood hydrolysate is only 130 g of NaOH/kg dry matter, when it is on average 350 g NaOH/kg dry matter in pulp cooking. This shows that hydrolysis-alkalisation of wood chips is economical in chemicals, especially when it is possible to use $Na_2CO_3$ instead of expensive NaOH in the alkalisation.

The invention claimed is:

1. A method of treating sodium-based waste liquor which comprises organic compounds sourced from lignocellulose, in order to recover chemical compounds, according to which method
the waste liquor is subjected to partial wet oxidation, in order to produce organic sodium salts,
characterized in that
after the partial wet oxidation at least part of lignin and inorganic salts that are present in the wet oxidized waste liquor are simultaneously precipitated, and
volatile organic compounds or their alkali salts are produced from the wet oxidised waste liquor, wherein the volatile organic compounds are selected from the group consisting of ketones, alcohols, aldehydes, organic acids, methane, ethane, and synthesis gas.

2. The method according to claim 1, characterized in that the waste liquor that is subject to partial wet oxidation is alkaline Na-based waste liquor from a biorefinery.

3. The method according to claim 2, characterized in that the waste liquor that is subject to partial wet oxidation is generated by one or more of the following steps: alkali dissolution of wood chips, alkaline hydrolysis of wood chips, dissolving of lignin-bearing pulp, and alkaline hydrolysis of residual pulp.

4. The method according, to claim 1, characterized in that the waste liquor that is subject to partial wet oxidation is alkaline Na-based black liquor or waste liquor from a pulp mill.

5. The method according to claim 1, characterized in that, after the partial wet oxidation of the waste liquor, bicarbonate, carbonate or sulphate salts are precipitated from the wet oxidised waste liquor.

6. The method according to claim 1, characterized in that the partial wet oxidised liquor is separated after being subjected to partial wet oxidation, where lignin, bicarbonate sediment and/or silicate compounds are precipitated from the partial wet oxidised liquor in the separation, and after which any bicarbonate sediment that is precipitated in the separation is washed, in order to dissolve any alkali compounds in the bicarbonate sediment.

7. The method according to claim 1, characterized in that the filtrate generated in the precipitation is cooled or/and vaporised, thereby crystallising the sodium salts of the organic acids.

8. The method according to claim 6, characterized in that any dissolved alkali compound is causticized or cooked, or part of the dissolved alkali compound is causticized and part of the dissolved alkali compound is cooked.

9. The method according to claim 1, characterized in that the lignin which is precipitated after the wet oxidising is moved to a separate reduction oven, in order to transform the lignin, which comprises sodium, to $Na_2CO_3$ and synthesis gas.

10. The method according to claim 1, characterized in that the lignin, which is precipitated after the wet oxidation, is dried.

11. The method according to claim 1, characterized in that the volatile organic compounds are produced from the wet oxidised waste liquor by drying and/or gasifying the wet oxidised waste liquor.

12. The method according to claim 1, further comprising heating the wet oxidised waste liquor in such a way that at least part of the organic salts are disintegrated, and after which separating gaseous products from the wet oxidised waste liquor.

13. The method according, to claim 12, characterized in that the wet oxidised waste liquor is heated at a temperature of approximately 270-370° C. and at an elevated pressure in hot water treatment, in order to at least partly disintegrate the organic sodium salts, after which the pressure is decreased in such a way that the water is vaporised and it is possible to separate the gaseous products from the wet oxidised waste liquor.

14. The method according to claim 1, characterized in that the volatile organic compounds produced from the wet oxidized waste liquor comprise methane and synthesis gas.

15. The method according to claim 1, characterized in that the volatile organic compounds are produced from the wet oxidized waste liquor by gasifying the wet oxidized waste liquor.

16. The method according to claim 1, further comprising gasifying the wet oxidized waste liquor or salts precipitated from the wet oxidized waste liquor to produce ash, dissolving the ash in water, filtering the dissolved ash in order to produce a filtrate comprising carbon and solids, and causticizing the filtrate to produce NaOH.

17. The method according to claim 1, further comprising subjecting the wet oxidized waste liquor or salts precipitated from the wet oxidized waste liquor to pyrolysis to produce ash, dissolving the ash in water, filtering the dissolved ash in order to produce a filtrate comprising carbon and solids, and causticizing the filtrate to produce NaOH.

18. The method according to claim 1, characterized in that the waste liquor is first partially oxidised to produce sodium acetate, and
after which at least part of the sodium acetate is disintegrated to volatile organic compounds comprising one or more of methane, acetone, and Na carbonate ash.

19. The method according to claim 1, characterized in that the waste liquor comprises black liquor, and the method further comprises drying the wet oxidized waste liquor to obtain dried black liquor and preparing acids of the organic sodium salts that are produced from the wet oxidised or dried black liquor.

20. The method according to claim 19, characterized in that the acids are produced
by adding mineral acid to the dried black liquor in order to generate a mixture, and after which, by distilling the mixture, or
by subjecting, the organic sodium salts to a reactive extraction with an extraction solvent, such as tertiary amine, is utilised in order to generate a complex, and after which the generated complex is disintegrated in order to generate acids of sodium salts.

21. The method according to claim 20, further comprising producing sodium salts of the organic acids by adding sodium bicarbonate to the organic acids.

22. The method according to claim 20, further comprising producing calcium salts of the organic acids by adding calcium carbonate to the organic acids.

23. The method according to claim 1, characterized in that the dry matter percentage of the waste liquor, which is subjected to partial wet oxidation, is at least 10-55% by weight.

24. The method according to claim 1, characterized in that the partial oxidation is carried out at an elevated temperature which is approximately 160-320° C.

25. The method according to claim 1, characterized in that waste liquor is wet oxidised in such a way that the pH value of the waste liquor decreases below 10.4, in order to at least partly precipitate the lignin.

26. The method according to claim 1, characterized in that the organic compounds comprise, lignocellulose-based carbohydrates or lignin or hydrolysis and reaction products of lignocellulose-based carbohydrates or lignin.

27. The method according to claim 1, characterized in that waste liquor is subjected to partial wet oxidation in conditions where Na salts of carboxylic acids and precipitated lignin are generated.

28. The method according to claim 27, characterized in that the pH value of the waste liquor is subjected to a value of approximately 8-10.4 in order to partially precipitate the lignin, thereby generating a treated black liquor composition, which comprises, in addition to sodium salts of short-chained carboxylic acids, also the precipitated lignin.

29. The method according to claim 27, further comprising subjecting the precipitated lignin to further processing.

* * * * *